US009436561B2

(12) United States Patent
Larson et al.

(10) Patent No.: US 9,436,561 B2
(45) Date of Patent: Sep. 6, 2016

(54) RECOVERY PROCESSING USING TORN WRITE DETECTION

(71) Applicant: Microsoft Technology Licensing, LLC, Redmond, WA (US)

(72) Inventors: Per-Ake Larson, Redmond, WA (US); Robert Patrick Fitzgerald, Fall City, WA (US); Cristian Diaconu, Kirkland, WA (US); Michael James Zwilling, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 269 days.

(21) Appl. No.: 13/892,124

(22) Filed: May 10, 2013

(65) Prior Publication Data

US 2014/0297608 A1 Oct. 2, 2014

Related U.S. Application Data

(60) Provisional application No. 61/806,337, filed on Mar. 28, 2013.

(51) Int. Cl.
*G06F 17/30* (2006.01)
*G06F 11/14* (2006.01)
*G06F 9/46* (2006.01)

(52) U.S. Cl.
CPC ........... *G06F 11/1471* (2013.01); *G06F 9/466* (2013.01); *G06F 11/1458* (2013.01); *G06F 11/1469* (2013.01); *G06F 17/3023* (2013.01); *G06F 17/30309* (2013.01); *G06F 17/30353* (2013.01); *G06F 17/30356* (2013.01); *G06F 11/1438* (2013.01)

(58) Field of Classification Search
CPC ..................... G06F 17/30309; G06F 17/3023; G06F 17/30356; G06F 17/30353; G06F 11/1471; G06F 11/1458; G06F 11/1469; G06F 11/1438
See application file for complete search history.

(56) References Cited

U.S. PATENT DOCUMENTS

| 5,845,292 | A | * | 12/1998 | Bohannon ........... G06F 11/1469 |
| 5,864,851 | A | * | 1/1999 | Breitbart et al. |
| 5,870,758 | A | * | 2/1999 | Bamford et al. |
| 6,901,481 | B2 | | 5/2005 | Olson |
| 7,266,724 | B2 | * | 9/2007 | Denda .................... G11B 19/04 369/30.23 |

(Continued)

OTHER PUBLICATIONS

"International Search Report & Written Opinion for PCT Patent Application No. PCT/US2014/031533", Mailed Date: Sep. 17, 2014, 13 Pages.

(Continued)

*Primary Examiner* — Shiow-Jy Fan
(74) *Attorney, Agent, or Firm* — Aneesh Mehta; Doug Barker; Kate Marochkina

(57) ABSTRACT

The recovery of a transaction, and perhaps the recovery of multiple transactions, in a computing system in which one or more persistent systems are coupled via a bus to one or more processors. As an example, the persistent system may serve as part of the main memory of the computing system. The transaction might implement multi-versioning in which a record is not updated in place. Rather, each record is represented as a sequence of one or more record versions, each version having a valid interval during which that the record version is considered to properly represent the record. Torn write guards may be used to verify that there are no torn writes in the record versions or in the log buffer associated with the transaction.

24 Claims, 7 Drawing Sheets

(56) References Cited

U.S. PATENT DOCUMENTS

| | | | |
|---|---|---|---|
| 7,512,636 B2 | 3/2009 | Verma et al. | |
| 7,801,866 B1 | 9/2010 | Kathuria et al. | |
| 7,930,695 B2* | 4/2011 | Chaudhry et al. | 718/100 |
| 8,255,645 B2 | 8/2012 | Ergan et al. | |
| 8,370,258 B2 | 2/2013 | Roberts et al. | |
| 8,396,831 B2 | 3/2013 | Larson et al. | |
| 2004/0249838 A1 | 12/2004 | Hinshaw et al. | |
| 2004/0267776 A1 | 12/2004 | Brown et al. | |
| 2006/0036574 A1 | 2/2006 | Schweigkoffer et al. | |
| 2006/0167960 A1 | 7/2006 | Lomet | |
| 2006/0218200 A1 | 9/2006 | Factor et al. | |
| 2006/0259518 A1* | 11/2006 | Lomet et al. | 707/201 |
| 2008/0222159 A1 | 9/2008 | Aranha et al. | |
| 2008/0235461 A1 | 9/2008 | Tan et al. | |
| 2009/0083488 A1* | 3/2009 | Madriles Gimeno et al. | 711/118 |
| 2009/0132535 A1* | 5/2009 | Surtani et al. | 707/8 |
| 2009/0287703 A1* | 11/2009 | Furuya | 707/8 |
| 2010/0211554 A1 | 8/2010 | Reid et al. | |
| 2011/0153566 A1 | 6/2011 | Larson et al. | |
| 2011/0231447 A1 | 9/2011 | Starkey | |
| 2011/0252000 A1 | 10/2011 | Diaconu et al. | |
| 2011/0302143 A1 | 12/2011 | Lomet | |
| 2011/0320496 A1 | 12/2011 | Reid et al. | |
| 2012/0095974 A1 | 4/2012 | Bentkofsky et al. | |
| 2012/0102006 A1 | 4/2012 | Larson et al. | |
| 2012/0109895 A1 | 5/2012 | Zwilling et al. | |
| 2012/0233139 A1 | 9/2012 | Larson et al. | |
| 2012/0254120 A1 | 10/2012 | Fang et al. | |
| 2012/0265743 A1* | 10/2012 | Ivanova et al. | 707/702 |
| 2012/0317384 A1 | 12/2012 | Bascunana Munoz et al. | |
| 2013/0013874 A1 | 1/2013 | Graefe et al. | |
| 2013/0013890 A1 | 1/2013 | Manner et al. | |
| 2013/0066948 A1* | 3/2013 | Colrain | H04L 67/146 709/203 |
| 2013/0111103 A1 | 5/2013 | Dodson et al. | |

OTHER PUBLICATIONS

Funke, et al., "Compacting Transactional Data in Hybrid OLTP &OLAP Databases", in Proceeding of the VLDB Endowment, vol. 5, Issue 11, Aug. 27, 2012, 12 pages.

Lodberg, et al., "MySQL in a Main Memory Database Context", in Technical Report, Department of Computer Science, University of Copenhagen, Feb. 2004, 8 pages.

Hu, Wei, "Oracle Database 11g Internals: Five Key High-Availability Innovations", Published on: Dec. 2010, Available at: http://www.oracle.com/technetwork/database/features/availability/s316923-175936.pdf.

Pinaldave, "SQL Server—What is Hekaton?—Simple Words Explanation", Published on: Dec. 23, 2012, Available at: http://blog.sqlauthority.com/2012/12/23/sql-server-what-is-hekaton-simple-words-explanation/.

"Oracle TimesTen In-Memory Database Recommended Programming Practices", Published on: Mar. 2006, Available at: http://download.oracle.com/otn_hosted_doc/timesten/603/TimesTen-Documentation/goodpractices.pdf.

Funke, et al., "HyPer-sonic Combined Transaction and Query Processing", in Proceedings of the VLDB Endowment, vol. 4, Issue 12, Aug. 29, 2011, 4 pages.

Grund, et al., "HYRISE—A Main Memory Hybrid Storage Engine", in Proceedings of the VLDB Endowment, vol. 4, Issue 2, Sep. 13, 2010, 12 pages.

Grund, et al., "An Overview of HYRISE—A Main Memory Hybrid Storage Engine", in Bulletin of the IEEE Computer Society Technical Committee on Data Engineering, vol. 35, Issue 1, Mar. 2012, 6 pages.

Harizopoulos, et al., "OLTP Through the Looking Glass, and What We Found There", in Proceedings of the ACM SIGMOD International Conference on Management of Data, Jun. 9, 2008, 12 pages.

"IBM SolidDB—Fastest Data Delivery", Retrieved on: Apr. 8, 2013, Available at: http://www-01.ibm.com/softwareidata/soliddb/.

Johnson, et al., "Shore-MT: A Scalable Storage Manager for the Multicore Era", in Proceedings of the 12th International Conference on Extending Database Technology: Advances in Database Technology, Mar. 24, 2009, 12 pages.

Kallman, et al., "H-Store: A High-Performance, Distributed Main Memory Transaction Processing System", in Proceedings of the VLDB Endowment, vol. 1, Issue 2, Aug. 24, 2008, 4 pages.

Kemper, et al., "HyPer: A Hybrid OLTP&OLAP Main Memory Database System Based on Virtual Memory Snapshots", in Proceeding of IEEE 27th International Conference on Data Engineering, Apr. 11, 2011, 12 pages.

Larson, et al., "High-Performance Concurrency Control Mechanisms for Main-Memory Databases", in Proceedings of the VLDB Endowment, vol. 5, Issue 4, Dec. 2011, 12 pages.

Levandoski, et al., "The Bw-Tree: A B-tree for New Hardware Platforms", in Proceeding of 29th IEEE International Conference on Data Engineering, Apr. 8, 2013, 12 pages.

"The LLVM Compiler Infrastructure", Retrieved on: Apr. 8, 2013, Available at: http:/llvm.org/.

Michael, Maged M., "Hazard Pointers: Safe Memory Reclamation for Lock-Free Objects", in IEEE Transactions on Parallel and Distributed Systems, vol. 15, Issue 6, Jun. 2004, 14 pages.

Michael, Maged M., "High Performance Dynamic Lock-Free Hash Tables and List-Based Sets", in Proceedings of the Fourteenth Annual ACM Symposium on Parallel Algorithms and Architectures, Aug. 10, 2002, 10 pages.

Neumann, Thomas, "Efficiently Compiling Efficient Query Plans for Modern Hardware", in Proceedings of the VLDB Endowment, vol. 4, Issue 9, Aug. 29, 2011, 12 pages.

"Oracle TimesTen", Retrieved on: Apr. 8, 2013, Available at: http://www.oracle.com/technetwork/products/timesten/overview/index.html.

Pandis, et al., "Data-Oriented Transaction Execution", in Proceedings of the VLDB Endowment, vol. 3, Issue 1-2, Sep. 13, 2010, 10 pages.

"Phoenix Compiler Framework", Retrieved on: Apr. 8, 2013, Available at: http://en.wikipedia.org/wiki/Phoenix_(compiler_framework).

"In-Memory Computing Overview—HANA—SAP", Retrieved on: Apr. 8, 2013, Available at: http://www.sap.com/solutions/technology/in-memory-computing-platform/hana/overview/index.epx.

"Drive Speed, Availability, and Scalability—for Less—with our Database Solutions", Retrieved on: Apr. 8, 2013, Available at: http://www54.sap.com/solutions/tech/database/software/overview.html.

Sundella, Hakan, "Lock-Free Deques and Doubly Linked Lists", in Journal of Parallel and Distributed Computing, vol. 68, Issue 7, Mar. 15, 2008, 14 pages.

"VoltDB", Retrieved on: Apr. 8, 2013, Available at: http://voltdb.com/.

Bohannon, et al., "The Architecture of the Dali Main Memory Storage Manager", in Journal of Multimedia Tools and Applications, vol. 4, Issue 2, Mar. 1997, 46 pages.

Campbell, Dave, "Breakthrough Performance with In-Memory Technologies", Published on: Nov. 8, 2012, Available at: http://blogs.technet.com/b/dataplatforminsider/archive/2012/11/08/breakthrough-performance-with-in-memory-technologies.aspx.

Volos, et al., "Mnemosyne: Lightweight Persistent Memory", in Proceedings of the Sixteenth International Conference on Architectural Support for Programming Languages and Operating Systems, Mar. 5, 2011, 13 pages.

Callaghan, Mark, "Do You Need the InnoDB Doublewrite Buffer?", Published on: Jul. 9, 2009, Available at: http://www.facebook.com/note.php?note_id=107329775932.

Sundella, et al., "Lock-Free Deques and Doubly Linked Lists", in Journal of Parallel and Distributed Computing, vol. 68, Issue 7, Jul. 2008, 13 pages.

U.S. Appl. No. 13/892,180, filed May 10, 2013, Larson, et al.
U.S. Appl. No. 13/892,173, filed May 10, 2013, Larson, et al.
U.S. Appl. No. 13/892,150, filed May 10, 2013, Larson, et al.
International Search Report & Written Opinion for PCT Patent Application No. PCT/US2014/031625, Mailed Date: Aug. 29, 2014, 12 Pages.

(56) References Cited

OTHER PUBLICATIONS

International Search Report & Written Opinion for PCT Patent Application No. PCT/US2014/031620, Mailed Date: Sep. 2, 2014, 12 Pages.

Vijayan Prabhakaran, et al., "Iron file systems", Proceedings of the Twentieth ACM Symposium on Operating Systems Principles, SOPS '05, Jan. 1, 2005, p. 206.

Vijayan Prabhakaran, et al., "Iron File Systems Committee in charge: Andrea C. Arpaci-Dusseau (Co-Chair), Remzi H. Arpaci-Dusseau (Co-Chair)", Jan. 1, 2006, Available at <<http://pages.cs.wisc.edu/~vijayan/vijayan-thesis.pdf>>.

Volos, et al., "Mnemosyne: Lightweight Persistent Memory", Mar. 11, 2011, Available at <<http:/ pages.cs.wisc.edu/~swift/papers/asplossl_mnemosyne.pdf>>.

International Search Report & Written Opinion for PCT Patent Application No. PCT/US2014/031629, Mailed Date: Sep. 29, 2014, Filed Date: Mar. 24, 2014, 13 pages.

International Preliminary Report on Patentability Received for PCT Application No. PCT/US2014/031629 Mailed Date: Jul. 22, 2015, 11 Pages.

International Preliminary Report on Patentability Issued in PCT Patent Application No. PCT/US2014/031533, Mailed Date: Jul. 24, 2015, 14 Pages.

International Preliminary Report on Patentability Issued in PCT Patent Application No. PCT/US2014/031620, Mailed Date: Jul. 22, 2015, 12 Pages.

International Preliminary Report on Patentability Issued in PCT Application No. PCT/US2014/031625, Mailed Date: Jun. 29, 2015, 11 Pages.

Second Written Opinion Issued in PCT Patent Application No. PCT/US2014/031625, Mailed Date: Mar. 5, 2015, 10 Pages.

U.S. Appl. No. 13/892,150, May 15, 2015, Office Action.

U.S. Appl. No. 13/892,180, May 15, 2015, Office Action.

U.S. Appl. No. 13/892,173, May 19, 2015, Office Action.

Office Action dated Oct. 2, 2015 cited in U.S. Appl. No. 13/892,173.

Office Action dated Oct. 2, 2015 cited in U.S. Appl. No. 13/892,180.

Office Action dated Oct. 9, 2015 cited in U.S. Appl. No. 13/892,150.

Notice of Allowance dated May 3, 2016 cited in U.S. Appl. No. 13/892,180.

Notice of Allowance dated Jul. 7, 2016 cited in U.S. Appl. No. 13/892,173.

\* cited by examiner

RECOVERY PROCESSING USING TORN WRITE DETECTION

CROSS-REFERENCE TO RELATED APPLICATIONS

This application claims the benefit of U.S. Provisional application 61/806,337 filed Mar. 28, 2013, titled "Database system using persistent main memory", which is incorporated herein by reference in its entirety.

BACKGROUND

Modern computing systems include one or more processors that are coupled to a system memory over a memory bus. The system memory includes memory locations that are addressable by the processor over the memory bus. The processor reads data from and writes data to the system memory via the memory bus. The processor might typically include one or more caches for faster reads and writes of data that is available in the cache.

As the system memory may not be large enough to contain all of the data and instructions that are needed, paging algorithms have been developed to page data and instruction between an external non-volatile storage (such as a hard disk drive or solid state disk) and system memory.

Database systems often manage database tables that are quite large, and thus often the structure of such tables is persisted on external non-volatile storage, while the current data being operated upon is paged into the system memory. However, more recent database systems store database tables in volatile system memory. The durability of such in-memory tables is ensured by logging all changes to external storage such as magnetic hard disk drives or solid state drives. In addition, such database systems may also maintain checkpoints of the database state on such external storage. After a crash, the latest database state is rebuilt in system memory from the latest checkpoints and the log.

BRIEF SUMMARY

At least some embodiments described herein relate to the recovery of a transaction, and perhaps the recovery of multiple transactions, in a computing system in which one or more persistent systems are coupled via a bus to one or more processors. As an example, the persistent system may serve as at least part of the main memory of the computing system. The transaction might implement multi-versioning in which a record is not updated in place. Rather, each record is represented as a sequence of one or more record versions, each version having a valid interval during which the record version is considered to properly represent the record.

As part of the recovery for a given transaction, post-commit processing information is identified that corresponds to the transaction and that is persisted in the persistent system. Using that post-commit processing information, each record version that was written as part of the transaction is identified. This includes newly created record versions and record versions that were deleted or rendered old by the transaction. Torn write guards may be used to verify that there are no torn writes in the record versions or in the log buffer associated with the transaction.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to the recovery of a transaction, and perhaps the recovery of multiple transactions, in a computing system in which one or more persistent systems are coupled via a bus to one or more processors. As an example, the persistent system may serve as at least part of the main memory of the computing system. The transaction might implement multi-versioning in which a record is not updated in place. Rather, each record is represented as a sequence of one or more record versions, each version having a valid interval during which the record version is considered to properly represent the record.

As part of the recovery for a given transaction, post-commit processing information is identified that corresponds to the transaction and that is persisted in the persistent system. Using that post-commit processing information, each record version that was written as part of the transaction is identified. This includes newly created record versions and record versions that were deleted or rendered old by the transaction. Torn write guards may be used to verify that there are no torn writes in the record versions or in the log buffer associated with the transaction.

Some introductory discussion of a computing system will be described with respect to FIG. 1. Then, the example performance of a transaction and recovery from failure in a computing system that has a persistent system that serves as at least part of main memory will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
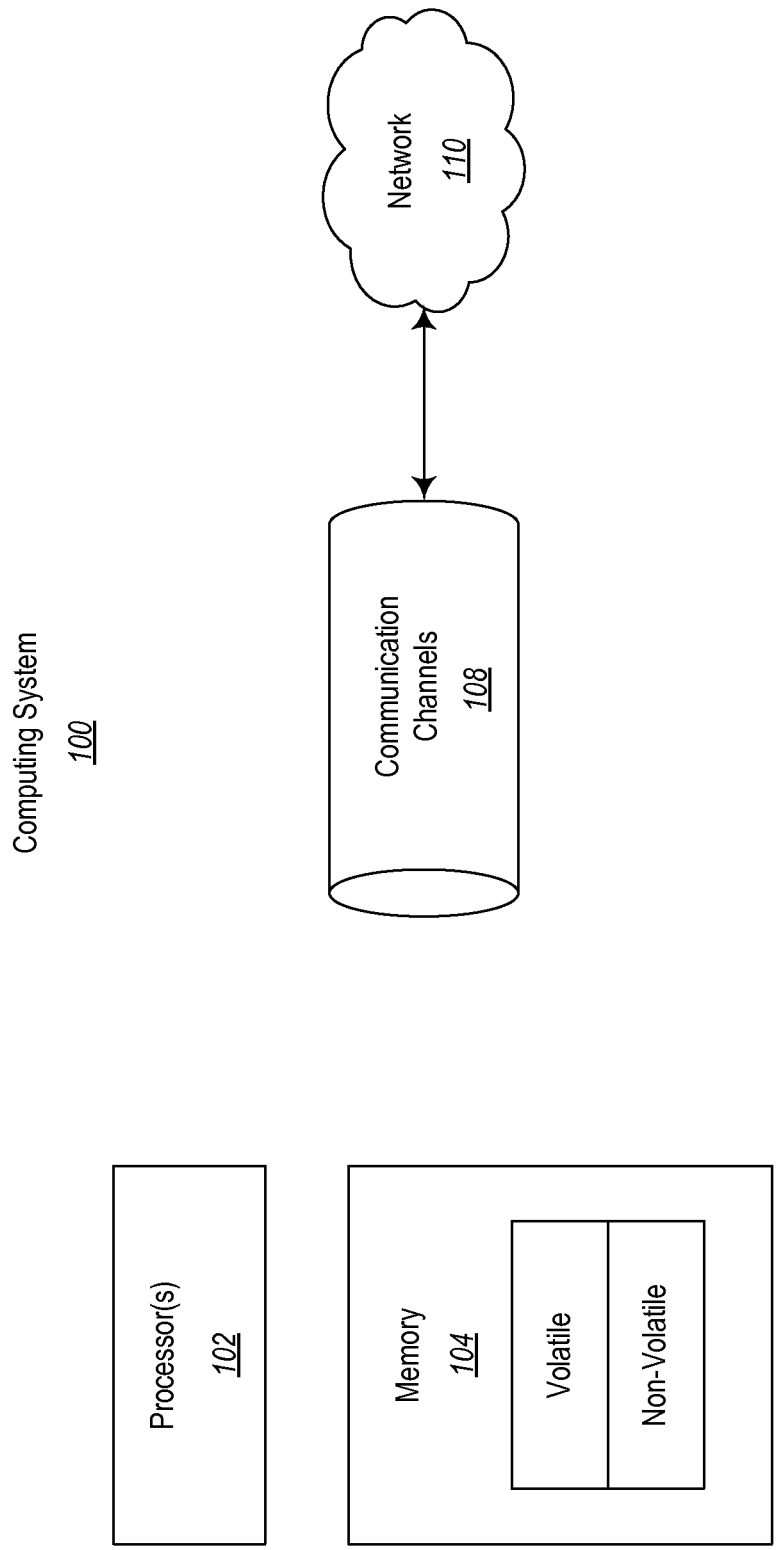
FIG. 1 abstractly illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Prior to describing the principles of recovery using post-commit processing information, an example mechanism for generating the post-commit processing information under normal operation will now be described herein. However, the principles of recovery described herein are not limited to this particular mechanism for generating the post-commit processing information.

Figure 2:
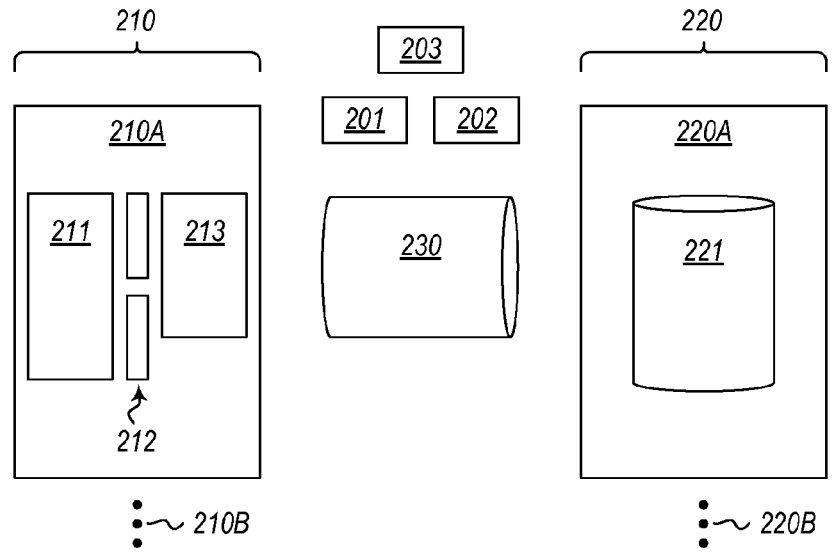
FIG. 2 illustrates a computing environment that includes one or more processors and one or more persistent systems coupled via a communication bus.

FIG. 2 illustrates a computing environment 200 that includes one or more processors 210 and one or more persistent systems 220 coupled via a communication bus 230. For instance, the processor(s) 210 include at least one processor 210A, but may include others as represented by the ellipses 210B. Any structure and functionality described herein as attributed to the processor 210A may likewise be present and performed by other processors, if any, in the processor(s) 210. The persistent system(s) 220 includes at least one persistent system 220A, but may include others as represented by the ellipses 220B. Any structure and functionality described herein as attributed to the persistent system 220A may likewise be present and performed by other persistent systems, if any, in the persistent system(s) 220. For instance, if the computing environment 200 were the computing system 100 of Figure, the processor 210A may be the processor 102 of FIG. 1, and the persistent system 220A may be an example of the memory 104 of FIG. 1.

In accordance with the principles described herein, the persistent system 220A includes a database 221. The database 211 need not provide checkpoints or logs external to the persistent system 220A. Rather, the persistent system 220A itself persists the database 221.

The processor 210A includes a logic unit 211, registers 212, and one or more caches 213. The computing environment 200 also includes a transaction module 201, a recovery module 202, and a timestamp generator 203. The timestamps generated by the timestamp generator 203 may express real time, although that is not required. Accordingly, in this description, the term "timestamp" is to be interpreted broadly. For instance, the timestamp generator 203 might simply produce monotonically increasing values that do not express time other than a relative temporal ordering at the granularity of the events that cause the monotonically increasing values. The timestamp generator 203 may, upon request, provide the most recent timestamp value (i.e., read the current timestamp) provided and/or produce a timestamp value (i.e., monotonically advance the timestamp) that is greater than any previously generated timestamp values.

When a transaction is begun, the transaction module 201 may instruct the processor 210A to perform operations so as to instantiate a transaction object that stores information about the transaction. The processor 210A in turn performs a transaction on the database 221 as specified by the user's transaction program. Likewise, the recovery module 202 may instruct the processor 220 to perform operations so as to perform a recovery of the database in a transactionally-consistent way (i.e., with uncommitted transactions rolled back, and with committed transactions completed). Alternatively, some or all of the functionality attributed to the transaction module 201 and/or the recovery 202 may be incorporated in hardware, such as perhaps directly within the processor 210A itself.

As the processor 210A reads from the persistent system 220A or from the database 221, the processor 210A addresses the location of the data being read over the bus 230 and likewise reads the corresponding data over the bus 230. The processor 210A writes to the persistent memory 220A by addressing the location to be written to and also by providing the corresponding data to be written over the 230.

There are three phases associated with writing data to the persistent system 220 in a cached variant. The first phase involves writing the processor 210A writing the data to the cache 213 (e.g., from one of registers 212). The second phase involves transferring the data from the cache 213 to the persistent system 220A over the bus 230. The second phase will also be referred to herein as "providing" or "transferring" the data to the persistent system. The third phase involves confirming that the data provided to the persistent system has indeed been persisted. This persisting might not occur immediately upon providing the data to the persistent system. For instance, perhaps the data is left in a memory controller for some time before actually persisting. In one embodiment, there is a command (which will be called a "Persist" command) that causes any unpersisted data that has been provided to the persistent memory to be persisted, and returns confirmation of the same to the issuer of the command. Some implementations might combine the first and second phases.

A database includes one or more records. In one embodiment, the database system is a multi-versioning database system in which each database record may be represented by a sequence of record versions. A multi-versioning database system does not update records in place, but relies instead on multi-versioning. An update of a record creates a completely new record version whose interval of validity does not overlap with that of the prior record version for that record.

Figure 3:
FIG. 3 illustrates an example record version format for use in a multi-versioning system in which records are not updated in place, but are modified by adding a new record version.

FIG. 3 illustrates an example record version format 300. The field 301 represents a valid interval begin boundary. An example of such a boundary is a begin timestamp (or BeginTS hereinafter). The field indicates the start of a record version's valid time interval. In the specific embodiment described hereinafter, the field contains either a transaction identifier (ID) or a timestamp. When a transaction creates a new record version, the transaction stores its transaction ID in this field 301. Once the transaction has committed, the transaction sets the field to its commit timestamp.

The field 302 represents a valid interval end boundary. An example of such a boundary is an end timestamp (or EndTS). This field indicates the end of a record version's valid time interval. It contains either a transaction ID or a timestamp. The field is initialized to a large value (which will be called hereinafter "infinity") when the record version is created. The "infinity" value is interpreted as essentially meaning that the valid interval does not have an ending. When a transaction updates a record version (e.g., when adding a new record version created through updating or deleting a record), the transaction first stores its transaction ID in this field. Once the transaction has committed, the transaction sets the EndTS field to its commit timestamp.

The field 303 is a version header field. This includes version header information required by the database system. An example suitable for some database systems is link fields. A table may have one or more indexes. In one implementation, each record for that table reserves a link field in each record that is used to store a pointer to the next record on a chain used by the index. When a new version of a record is created, the new record version is immediately inserted into all indexes of the table to which the corresponding record belongs.

The field 304 is the payload, which contains the user data and is immutable. That is, any update of the payload causes a new record version to be created, rather than editing the content of the payload field 304 of the current record version.

Normal Processing

Figure 4A:
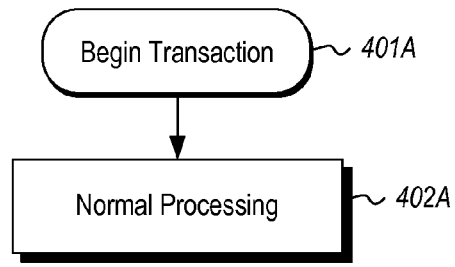
FIG. 4A illustrates a first phase of transaction processing in which a begin transaction event triggers normal processing.
Figure 4B:
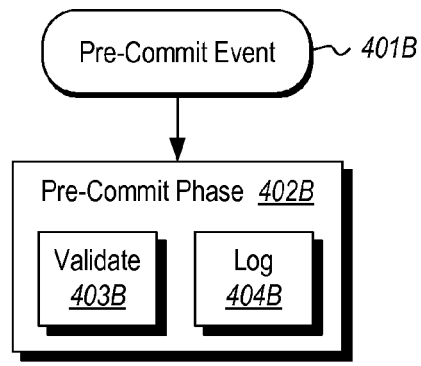
FIG. 4B illustrates a second phase of transaction processing in which a pre-commit event triggers a pre-commit processing phase include a validation process and a logging process.
Figure 4C:
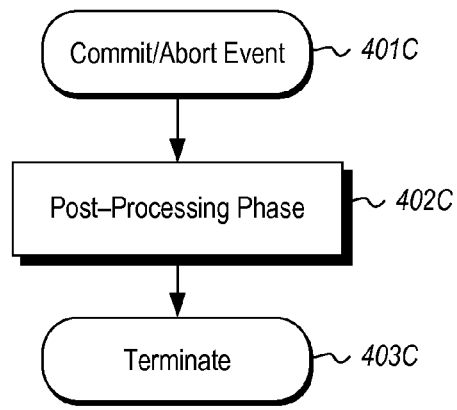
FIG. 4C illustrates a third phase of transaction processing in which a commit/abort event triggers a post-processing phase, and is concluded by a terminate event.

FIGS. 4A through 4C together illustrate a method (hereinafter referred to as "method 400") for performing a transaction. In this case, the method 400 includes three different phases 400A, 400B and 400C of processing (illustrated in FIGS. 4A through 3C respectively). The three phases 400A through 400C are bracketed by four events. The method 400 may be performed by, for example, the transaction module 201 of FIG. 2.

In FIG. 4A, a begin transaction event 401A triggers the normal processing phase 402A. The begin transaction event 401A causes the creation of a transaction object with a new unique transaction identifier (ID). In an example embodiment, the transaction object has a state that is set to be an active state. Furthermore, the transaction reads the current timestamp from the timestamp generator 203, which timestamp represents the transaction's logical read time (and will also be referred to herein as the transaction's "begin time"). Only record versions whose valid time interval includes the transaction's logical read time are visible to the transaction. All other record versions are ignored.

After having created the transaction object, the transaction does its normal processing 402A, in which the transaction might perform zero or more read operations, zero or more write operations, and zero or more scan operations. During normal processing 402A, the transaction object tracks the transaction's read set, write set and scan set. A transaction's read set contains a reference (e.g., a pointer) to all record versions read by the transaction. The write set contains a reference (e.g., a pointer) to all new record versions (hereinafter referred to as "new record versions" or "newly created record versions") created by the transaction and all updated record versions (hereinafter "rendered old record versions") rendered no longer current by the transaction.

As an example, newly created record versions may be created by the transaction with a surrogate BeginTS (field 301) that is the transaction ID of the creating transaction. Rendered old record versions (i.e., a record version that no longer represents the newest version of a record due to a new record version created by the transaction) have their EndTS (field 302) changed from infinity to a surrogate timestamp that is the transaction ID of the transaction.

In FIG. 4B, a pre-commit event 401B triggers a pre-commit phase 402B. The pre-commit event 401B occurs when the transaction causes the timestamp generator 303 to advance the timestamp and the transaction advances from the active state to a pre-commit state. If the transaction commits, the timestamp obtained as part of this event will be its commit timestamp (also called herein "CommitTS") and will determine the transactions position in the commit sequence of all transactions.

The pre-commit phase 402B consists of two acts—namely validation 403B and logging 404B. In order to validate 403B, the transaction validates its read set and scan set. The transaction checks whether it would see exactly the same record versions if all of its reads were performed as of the commit timestamp as compared to the logical read time (represented by the timestamp obtained by the transaction at the beginning of the transaction at event 401A). The degree of validation required depends on the transaction's isolation level.

As for logging 404B, if validation 403B fails, nothing is logged. If validation 403B succeeds, the transaction saves post-commit processing information into a log buffer including the transaction identifier, a commit record including a timestamp, and other information that can be used to perform post-commit processing. It then writes the log buffer to the persistent system and, if the write completes successfully, the transaction has been irrevocably committed.

The method 400C of FIG. 4C is initiated by a commit/abort event 401C. If validation 403B and logging 404B complete successfully, the transaction changes its state from the pre-commit state to the committed state. Otherwise, if validation 403B or logging 404B does not complete successfully, the transaction changes its state from the pre-commit state to an aborted state.

The commit/abort event 401C initiates a post-processing phase 402C. If the transaction is aborted, the transaction marks each new record version that it created as garbage by setting its BeginTS to infinity and/or its EndTS to zero. The transaction sets the EndTS of each record version that it would have rendered not current back to infinity, so that the old record version can again be considered current.

If the transaction committed, in which case the post-processing phase 402C may be referred to as the "post-commit processing phase", the transaction scans the write set and finalizes the timestamp of each record version that it has inserted, updated or deleted. In new record versions created by the transaction, the transaction sets BeginTS (field 301) to CommitTS. In record versions that are rendered not current by the addition of new record versions created by the transaction, the transaction sets EndTS (field 302) to CommitTS.

The termination event 403C occurs when the post-processing 402C completes. In this event, the transaction switches from the committed or aborted state to a terminated state. A read-only transaction does not need to validate its read set, so it skips the validation phase, commits immediately, and skips the post-processing phase.

A record version is no longer needed and can be logically removed from the database as soon as its valid time interval no longer overlaps the lifetime of any active transaction. In this context, a transaction is considered active until it has completed all of its post-processing and its state has been changed to terminated.

Figure 5:
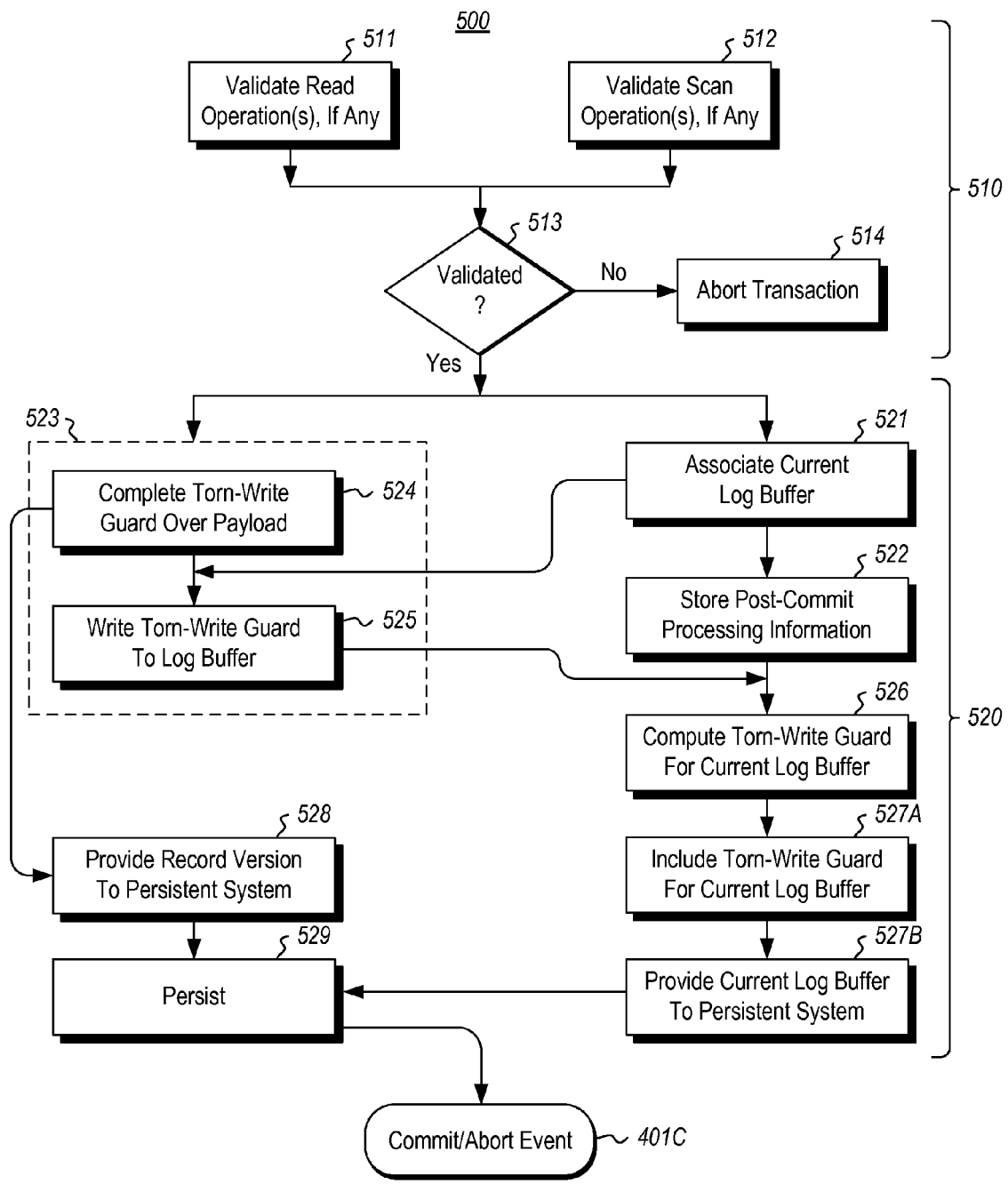
FIG. 5 illustrates a flowchart of a method for performing pre-commit processing of a transaction on a database in a persistent system.

FIG. 5 illustrates a flowchart of a method 500 for performing pre-commit processing of a current transaction on a database in a persistent system. For instance, the method 500 may be performed by the processor 210A in the context of computing environment 200. The pre-commit processing phase involves a validation process 403B and a logging process 404B.

The method 500 involves pipelining of work performed with the current transaction, with processing of the two prior transactions. Accordingly, when the method 500 begins to perform the pre-commit phase 402B of the current transaction, there is still some unfinished processing with respect to a prior transaction. Specifically, the post-processing phase 402C of the prior transaction is yet to be completed. The valid time intervals of the record versions that have been created or updated in the prior transaction have been computed, but such have not yet been confirmed to have been persisted. In addition, the log buffer for the prior transaction is yet to be prepared for release back into the free log buffer pool. As for the transaction prior to that, the log buffer (having been properly prepared for release into the free log buffer pool), may be released to the free log buffer pool. Thus, a current worker thread processes a particular transaction in three phases:

Phase I: Perform pre-commit processing of the particular transaction, begin post-commit processing of the particular transaction by finalizing (but not persisting) timestamps of record versions created or updated by the particular transaction, and delay continuing to the termination event until post-commit processing of the particular transaction is complete;

Phase II: While performing post-commit processing of Phase I for a first subsequent transaction, continue post-commit processing of the particular transaction by preparing the log buffer for the particular transaction to be freed, and delay continuing to the termination event until post-commit processing of the particular transaction is complete; and Phase III: While performing post-commit processing of Phase I for a second subsequent transaction, and post-commit processing of Phase II for the first subsequent transaction, continue post-commit processing of the particular transaction by freeing the log buffer for the particular transaction, and continuing to the termination event since post-commit processing of the particular transaction is now complete.

Figure 7:
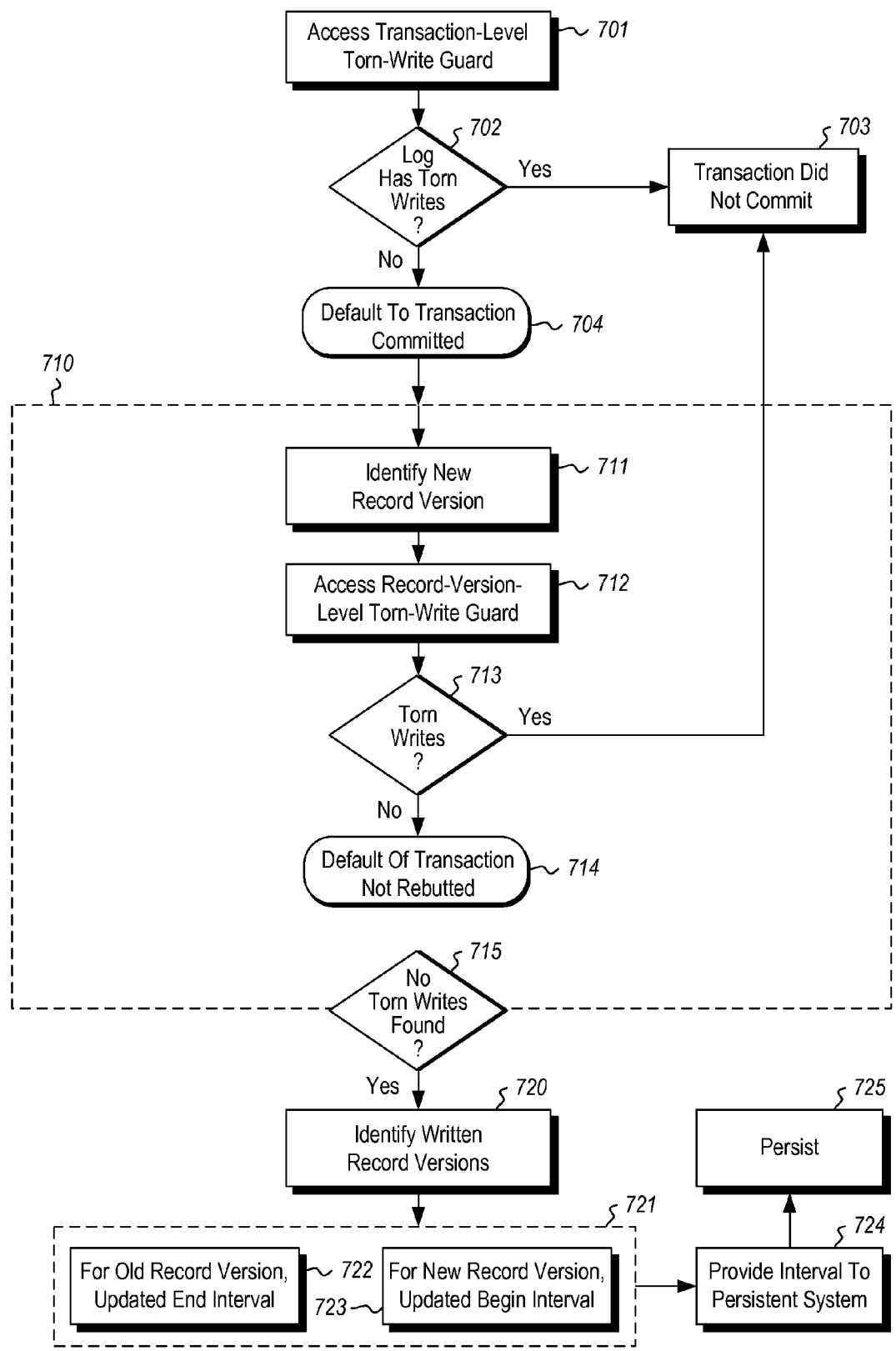
FIG. 7 illustrates a flowchart of a method for a first part of recovering a computing system that has a persistent system.

The method 500 provides torn-write guards so that the method 700 of FIG. 7 can determine whether a transaction has committed or not. A torn write exists between the time that a write command has been issued, and the time that the write has been performed on the durable target of the write command. If a system failure were to occur after the time that the write command is issued, but occurs before the write is persisted on the durable target, then the torn write continues to exist beyond the system failure. A collection of atomic units contains a torn write if any of the atomic units in the collection contains a torn write.

A log buffer for a particular transaction stores enough information to be able to verify, at recovery time, whether all of a transaction's database changes have been persisted. Similarly, enough information is stored in the log buffer to be able to verify whether the log buffer itself was completely persisted. A transaction is considered committed if no torn writes are detected. As this embodiment relies on torn write guards during recovery, a few details regarding two embodiments of torn-write guards will now be described prior to describing further details regarding method 500. The two embodiments will be referred to as the checksum embodiment, and the clean slate embodiment.

The checksum embodiment involves 1) computing a checksum over the payload of each new record version and 2) adding the checksums to the log buffer of the transaction. Although checksums may also be computed and saved to the log buffer for rendered old record versions of the transaction, this is not required because the transaction only changed their timestamps, whereas the checksum is computed over the payload. Once this is completed for all new record versions, a checksum is computed over the contents of the log buffer. The checksum of the log buffer may then be saved as part of the log buffer.

During recovery, the checksum is again computed over the log buffer (except for that portion in which the previously computed checksum is saved) and compared against the checksum saved in the log buffer. If these checksums match, the log buffer was completely persisted during normal operation. Accordingly, the contents of the log buffer are valid, and thus recovery can continue to rely on the contents of the log buffer.

Next, for each new record version created by the transaction, a checksum is computed on the record version and compared against the saved checksums for that record version in the log buffer. If they match, the payload of the new record version was correctly persisted. If this is true for all new record versions created by the transaction, the transaction's updates are all reflected in the database. Accordingly, the transaction may be considered committed, and recovery can proceed to perform post-commit processing for the transaction to finalize the transaction.

If any of the checksum matches fail, the transaction is not committed. In that case, none of its changes are included in the recovered database. This can be done by resetting the valid interval end markers of the rendered old record versions to infinity to thereby re-categorize these record versions as current, and by setting the begin timestamp of the newly created record versions to the transaction ID stored in the log buffer, to thereby render these record versions invalid. Alternatively, one can forego setting the begin timestamps of the newly created version to the transaction ID.

When checksums are used for torn-write detection, the log buffer includes the following information:
1) The checksum over the rest of the log buffer;
2) Transaction ID;
3) Commit timestamp;
4) List of references (e.g., pointers) to rendered old record versions;
5) List of references (e.g., pointers) to newly created record versions; and
6) List of checksums, one checksum for each newly created record version (or a single checksum if all created versions are concatenated together).

Checksums are not without a possibility of error. There is a small probability of not detecting a torn write since many different values may map to a single checksum value, but this probability can be made arbitrarily small by using larger checksums. Computing checksums also consumes processing cycles.

In the clean slate embodiment, before storing a new record version into an empty record slot, the record slot is filled with a predetermined background bit pattern and persisted. When the record version is written to the empty record slot, the record version is checked to see whether the background pattern by chance shows through (that is, whether any of its cache lines contains the background pattern). A bit map is then stored in the log buffer for the transaction, wherein each bit corresponds to a unit (hereinafter, an "atomic unit") that can be atomically persisted in the persistent system. That bit is set for any atomic unit that happens to contain the background pattern, and is not set otherwise.

At recovery time, the atomic units of the transaction's new record versions are checked. If atomic unit does not contain the background pattern, it can be concluded that the atomic unit was persisted. If the atomic unit contains the background pattern, the corresponding bit of the record versions bit map is checked. If the bit is set, then the atomic unit content is correct. Otherwise, the atomic unit was not persisted in the database. The checking of the atomic units may be performed per cache line such that multiple atomic units for the cache line are checked at the same time.

The same clean slate technique can be applied to detect torn writes in the log buffer. When acquiring the log buffer, the log buffer is filled with the background pattern and persisted. A portion of the log buffer (e.g., the first cache line) may be used for storing a bit map. Once the log buffer has been filled, the log buffer is checked for atomic units containing the background pattern. For any found atomic units that match the background pattern, the corresponding bit is set in the bit map. To ensure that the cache line storing the bit map does not contain the background pattern, the last bit of the bit map may be consistently set to be a value different than that of the background pattern.

With a well-chosen background pattern (e.g., alternating zero and one bits), few record versions are likely to have cache lines containing the background pattern. To reduce the log buffer size, bitmaps may be stored only for the record versions that do contain a cache line with the background pattern. In this case, perhaps one available bit (called hereinafter a "re-purposed bit") may be used from the pointer structure that contains the pointer for each new record version can be used to indicate whether the new record version has an associated bit map.

When using the clean slate technique for torn write detection, the log buffer may contain the following information:
1) Bit map covering the log buffer (may be one cache line);
2) Transaction ID;
3) Commit timestamp;
4) List of references (e.g., pointers) to rendered old record versions;
5) List of references (e.g., pointers) to new versions, perhaps one re-purposed bit to indicate presence of an associated bit map; and
6) A list of bit maps, at most one for each newly created record version (or a single bitmap for all of the newly created record versions together).

One advantage of the clean slate embodiment over the checksum embodiment is that less processing overhead is used during normal operations. Checking cache lines is faster than computing checksums. The clean slate approach also uses less space because most new record versions will not need a bit map. It has one drawback though: the need to prefill record slots with the background pattern and persist it. For ease of presentation, it was described above as if this pre-filling would be done just before filling a record slot with a new record version. This is wasteful and requires a lot of separate persists to the persistent system 210A. However, this disadvantage can be greatly mitigated by prefilling and persisting record slots in bulk before they are needed. It can, for example, be done when record slots are freed for reuse. This is already done in (small) batches so a Persist operation at the end of the batch will be amortized over multiple slots.

With this understanding of torn write guard embodiments, this description now returns to description of the method 500 of FIG. 5. The validation process 403B validates the scans and the read set to the extent required by the isolation level of the transaction. If validation is successful, the transaction begins its logging process 404B. The logging 404B consists of persisting the transaction's changes to a persistent system (e.g., persisting system 220A), building the log buffer, and persisting the log buffer also to the persistent system. In FIG. 5, the validation process 403B is represented by the acts within brackets 510.

The validation process 510 validates reads and scans to the extent required by the transaction's isolation level. For instance, referring to FIG. 5, the method 500 validates one or more read operations of the transaction (act 511). For instance, the transaction verifies that the record versions read in each read operation remains visible to the transaction if the read operation were repeated at the commit time of the transaction as compared to the begin time (i.e., the logical read time) of the transaction.

The method 500 also validates one or more scan operations of the transaction (act 512). For instance, the transaction verifies that the record versions visible to each scan operation are the same, regardless of whether the scan is performed at commit time of the transaction or the begin time (i.e., the logical read time) of the transaction.

If the validation fails ("No" in decision block 513), the transaction is aborted (act 514). If the transaction is aborted, the transaction marks each new record version created by the transaction so that the valid interval indicates that the record version is no longer valid. For instance, the BeginTS could be set to zero and the record slot returned to its free list. The transaction also marks each old record version rendered no longer current by the transaction, so that the old record version is again current. For instance, the transaction might set the EndTS of such record versions back to infinity, so that the old record version can again be considered current.

On the other hand, if the validation succeeds ("Yes" in decision block 513), the pre-commit processing method 500 enters the logging process represented by the acts encompassed by the brackets 520, and represented by element 404B of FIG. 4.

A log buffer is associated with the current transaction (act 521). This log buffer will be referred to as a "current log buffer" as it is associated with the current transaction. In one implementation, a pool of log buffers are made available to assist with transactions that are pending so that post-commit processing information may be included to help wind up the transaction to be properly terminated. Each log buffer might have one of three states; a free state, a filling state, and a filled state. Any log buffer that has a free state is within the pool of log buffers that may be drawn upon. The transaction locates a log buffer that has a free state, and changes the state from free to filling, thus rendering it the current log buffer. Furthermore, a transaction ID associated with the transaction may be included within the log buffer.

The transaction then stores post-commit processing information in the log buffer (act 522). This includes a commit marker (e.g., CommitTS) for the transaction, and a reference (such as a pointer) for each record version that is created by the transaction and for each record version that is updated by the transaction. The post-commit processing information contains information needed to complete post-commit processing during recovery if this becomes necessary.

In addition, for each record version that is newly created by the transaction, the content of box 523 is performed. For instance, a torn-write guard is created over the payload (field 304) of the new record version (act 524) and written to the log buffer (act 525). For instance, in the checksum embodiment, a checksum of the payload is calculated, and provided in the current log buffer in a manner that is associated with the corresponding newly created record version. In the clean slate embodiment, it is determined whether or not any cache lines of the newly created record version happen to match the background pattern. If not (which would likely be most of the cases), then the re-purposed bit (the bit of the structure that includes the pointer to the new record version) may reflect that there is no bitmap for the new record version. If so, then the re-purposed bit may reflect that there is a bitmap, and the bitmap may be included in the current log buffer, with the appropriate bit or bits (that correspond to the cache line or lines that happens to include the background pattern) being set.

Once the current log buffer is filled with all of the post-commit processing information including the commit marker, and the references to the new and updated record versions (reference act 522), and the torn-write guards (reference act 525), a torn-write guard is created for the current log buffer (act 526). In the checksum embodiment, this may be accomplished by calculating a checksum over the current log buffer and including that calculated checksum within the current log buffer. In the clean slate embodiment, there might be a bitmap associated with the current log buffer, in which there is a bit corresponding to each cache line of the current log buffer. If the corresponding cache line happens to match the background pattern, then the bit is set, and otherwise not.

The transaction-level torn-write guard is then associated with the post-commit processing information (i.e., the current log buffer) of the current transaction. (act 527A). This may be accomplished by included the torn-write guard computed over the current log buffer in the current log buffer itself. The current log buffer is then marked as filled.

The post-commit processing information and the associated torn-write guard are then provided to the persistent system 220A (act 527B). This may be performed by providing the current log buffer to the persistent system 220A in the case of the associated torn-write guard of the log buffer being included with the current log buffer itself. When operating upon data and providing such data to the persistent system, the processing 210A may operate in units of data called "cache lines". Thus, when providing the current log buffer to the persistent system 220A, the processor 210A provides the cache lines that encompass the current log buffer to the persistent system 220A. Any data operated upon by the processor 210A may be in a single cache line, or may encompass multiple cache lines.

In this description and in the claims, when an item of data (such as a record version, a log buffer, or portion(s) thereof) is transferred or provided to the persistent system 220A, this does not necessarily mean that the item of data is persisted right away in the persistent system 220A. For instance, when providing an item of data to the persistent system, the item of data might be provided to a store buffer of a memory controller for the persistent system 220A. Thus, if a system failure occurs between the time that the item of data is provided to the persistent system 220A and the time that the item of data is made durable in the persistent system 220A, the item of data will not be available upon recovery.

In the logging process, for each record version that is created by the transaction, the newly created record version is provided to the persistent system 220A (act 528). For each record version that is updated by the transaction (i.e., each record version that is rendered not current by the transaction), a portion of the record version is provided to the persistent system (also act 528). The providing to the persistent system may be performed at any time after the processor 210A has completed computing the torn-write guard for the corresponding record version, and even earlier if the processor retains a copy of the record version.

If that newly created record version is distributed across multiple cache lines, all of those cache lines are provided from the processor 210A to the persistent system 220A. When updating an old record version to reflect that it is no longer current, only the valid time interval need be changed, and in fact only the EndTS (field 302) need change. Accordingly, there might perhaps only be one portion of the record version being operated upon within the processor cache 213. This EndTS might be present even in a single cache line. Accordingly, only that cache line that contains EndTS would be provided to the persistent system 220A.

The logging process then confirms that the data that have been provided to the persistent memory have indeed been persisted (act 529) in the persistent system. As previously mentioned, there is an embodiment in which items of data provided to the persistent system are not necessarily persisted right away in the persistent system 220A. However, the transaction may issue a command causing any data provided to the persistent system that has not yet been made durable, to in fact be made durable (or persisted) in the persistent system. For instance, such a command might cause any data within a store buffer of the persistent system 220A to be persisted in the persistent system 220A. Once this persisting occurs, the command returns, allowing the transaction to conclude that all of the data has been made durable in the persistent system 220A. In this description, this command will be referred to as a "Persist" command.

Figure 6:
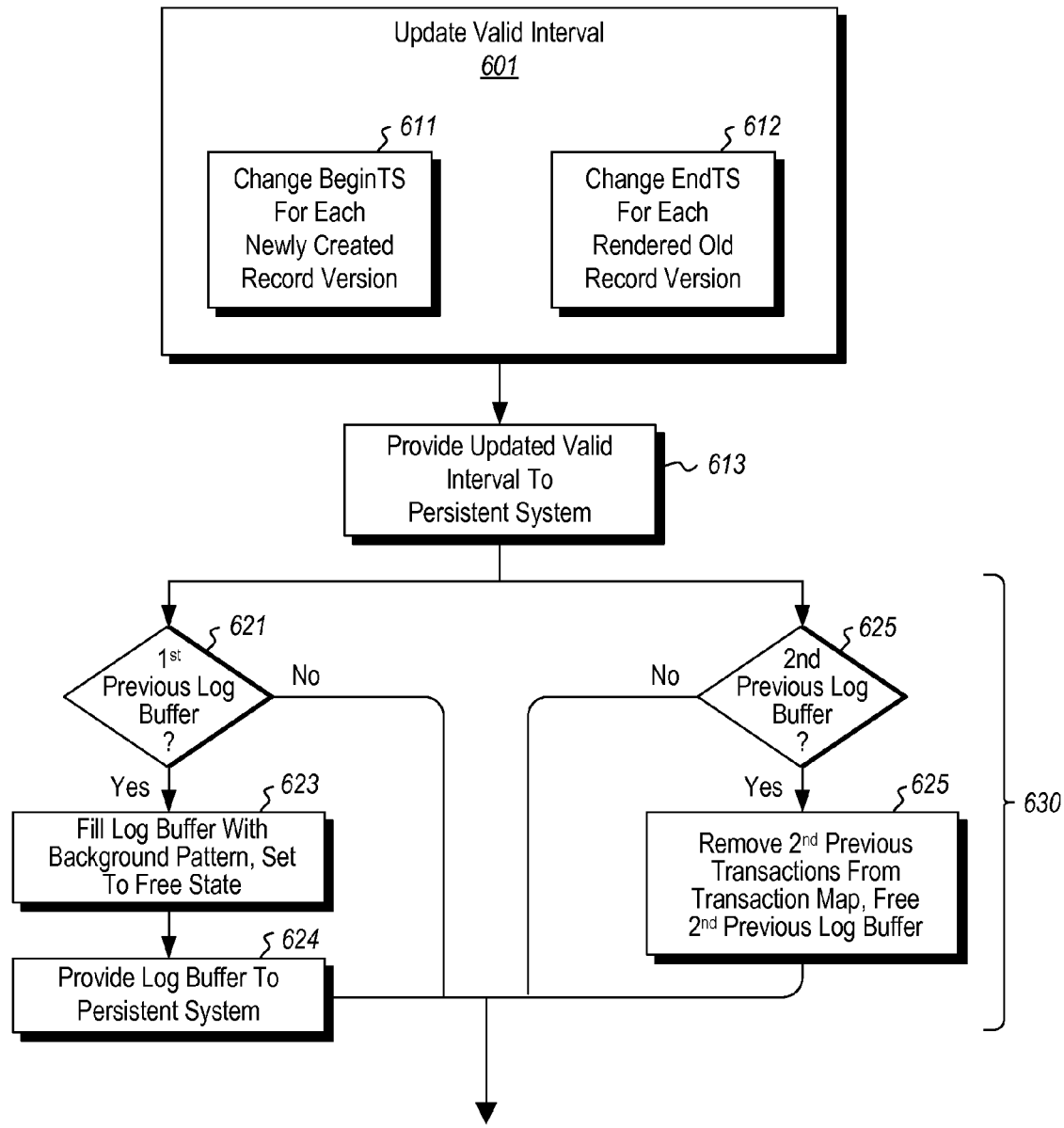
FIG. 6 illustrates a flowchart of a method for post-commit processing the transaction.

FIG. 6 illustrates a flowchart of a method 600 for post-commit processing of the current transaction. The method 600 may be performed by the transaction after, for example, performing the method 500 of FIG. 5. During post processing, the time interval changes are finalized.

For each record version that is newly created or rendered old by the transaction, the transaction updates the valid interval using the post-commit processing information (act 601). As an example, in the context of FIG. 3, for each newly created record version, the transaction updates the valid interval beginning boundary (e.g., field 301) (act 611) using the post-commit processing information to reflect the commit time (CommitTS) of the transaction. In the context of FIG. 3, for each old record version that is rendered not current by the transaction, the transaction updates a valid interval end boundary (e.g., field 302) (act 612) using the post-commit processing information. The updated valid interval is then provided to the persistent system (act 613). At this point, the transaction object does not confirm that the updated valid intervals have been persisted to the persistent system.

In the Persist command of act 529, a number of items of data can be confirmed to be persisted in the persistent system 220A. For instance, in act 527B, the current log buffer with torn-write guard was provided to the persistent system. The Persist command confirms that this was durably persisted in the persistent system. In act 528, the newly created and updated record versions were provided to the persistent system, and thus the Persist command also confirms that these new and updated record versions are made durable in the persistent system.

However, not shown in FIG. 5 are a number of other items of data that were provided to the persistent system in a prior iteration of the method 500 for a prior transaction. This single Persist command also results in confirmation that this previously provided data was also durably persisted within the persistent system 220A. For instance, valid interval updates of record versions newly created or updated by the prior transaction have now been confirmed to be persisted in the persistent system. Furthermore, in the case of the torn-write guard being implemented using the clean slate embodiment, the log buffers associated with the second prior transaction has now been reset with the background pattern, with its free state confirmed to be persisted.

In the remainder of method 600, further log buffer cleanup 630 associated with prior transactions may be performed. If there is a previous transaction and this is the clean slate embodiment (and thus an associated previous log buffer) ("Yes" in decision block 621), the previous log buffer is filled with the background pattern and set to a free state (act 623) and provided to the persistent system 220A (act 624). Acts 623 and 624 are not necessary in the checksum embodiment. This could be performed because the previous log buffer is no longer needed since the new and updated record versions had their valid time intervals confirmed to be made durable in act 529. At this point, that previous log buffer with the background pattern and free state are not yet confirmed to be made durable in the persistent system.

Also, if there is a second previous transaction (and thus a second previous log buffer) ("Yes" in decision block 622), this second previous log buffer would have had its background pattern and free state confirmed to be made durable in act 529. Accordingly, the second previous log buffer is now part of the free log buffer pool, and the second previous log buffer will be recognized as free by the recovery manager. Thus, the second previous log buffer may be added to the free log buffer list. Furthermore, the second previous transaction may be removed from the transaction map (act 625).

Thus, what has been described is a method for processing a transaction from beginning to end, when the transaction performs processing on record versions within a persistent system.

Recovery Processing

Figure 8:
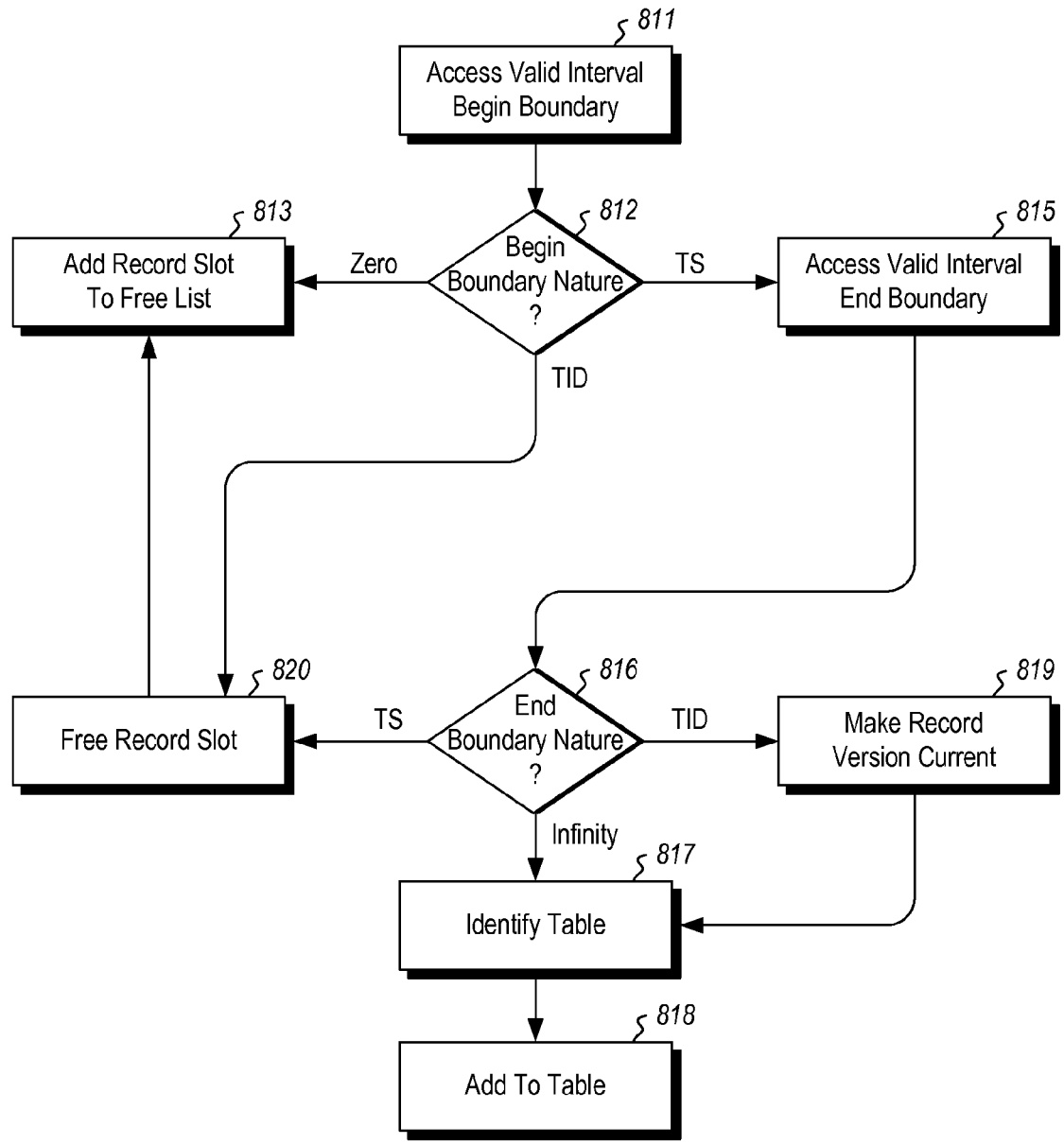
FIG. 8 illustrates a flowchart of a method for a second part of recovering in a computing system that has a persistent system.

FIG. 7 illustrates a flowchart of a method 700 for a post-processing that is performed for each pending transaction as a first part of recovering in a computing system that has one of more persistent systems coupled via a system bus to one or more processors. FIG. 8 illustrates a flowchart of a method 800 for a second part of recovering in the computing system, the second part including rebuilding an index and freeing up unused record slots. For instance, the methods 700 and 800 may be performed the recovery module 202 in the context of the computing environment 200 of FIG. 2.

The method 700 is performed for each log buffer found that is not in a free state (e.g., is not part of the free log buffer pool). Recall that each unfree log buffer is associated with a transaction. That association will be apparent to the recovery process. For instance, the transaction ID itself might be included within the log buffer.

The log buffer state and the transaction-level torn-write guard are accessed from the log buffer (act 701). For instance, in the checksum embodiment, the checksum computed over the remainder of the log buffer is accessed from the log buffer. In the clean slate embodiment, the bitmap computed over the remainder of the log buffer is accessed from the log buffer.

The transaction-level (or log-buffer-level) torn-write guard is then used to verify whether or not the log buffer (i.e., the post-commit processing information) contains no torn writes (decision block 702) and that the log buffer is marked as "filled". If the log buffer is not marked as "filled" or if there are torn writes in the log buffer ("Yes" in decision block 702), then the method 700 determines that this transaction did not commit (act 703). The changes that were performed by the transaction will be undone when performing method 800 described further below.

If the log buffer is marked as "filled" and if act 814 there are no torn writes in the log buffer ("No" in decision block 702), then a rebuttable presumption is created that the transaction committed (act 704). The method 700 then continues to determine if there is a rebuttal to this presumption when checking each of the record versions updated as part of the transaction. Accordingly, the method 700 performs the content of box 710 for each record versions created by the transaction.

For each of the created record versions, the recovery module identifies the corresponding record version created by the transaction using the post-commit processing information (act 711). The associated record-version-level torn-write guard corresponding to the new record version is then identified using the post—commit processing information (act 712).

The corresponding record-version-level torn-write guard is then used to confirm whether or not the corresponding record version has no torn writes (decision block 713). For instance, in the checksum embodiment, a checksum is computed over the payload of the record version. This is compared to the checksum associated with the record version (that was computed in act 524). If they match, then there are no torn writes in the record version. If not, then there are torn writes in the record version.

In the clean slate embodiment, each atomic unit of the record version payload is analyzed to see if it contains the predetermined pattern. If none of the atomic units of the record version payload contain the background pattern, then there are no torn writes in the record version. If there are one or more atomic units of the record version payload that contain the background pattern, then further analysis is needed to determine if the presence of the background pattern means that there is a torn write, or that it just happens that one of the atomic units written to the record version just happen to have the background pattern.

To determine this, the bitmap associated with the record version may be reviewed to see if the corresponding atomic unit has a set bit (in which case, the background pattern was written). If the bit is set, then there are no torn writes in that atomic unit. If the bit is not set, then there is a torn write in the catomic unit (as well as in the record version). Recall though the more specific embodiment in which the pointer to the record version includes a re-purposed bit that indicates whether or not the record version even has a corresponding bitmap. If there is no corresponding bitmap, then none of the atomic units of the record version are supposed to match the background pattern. Accordingly, if an atomic unit that matches the background pattern is found in a record version, and the re-purposed bit indicates there is no bitmap for the record version, then this atomic unit represents a torn write.

Based on the analysis of the record-version-level torn-write guard, if there is a torn write ("Yes" in decision block 713), then the rebuttable presumption of act 704 has been rebutted, and the recovery module determines that the transaction did not commit (act 703). On the other hand, if there are no torn writes found as part of this analysis ("No" in decision block 713), then the rebuttable presumption that the transaction commit has not been rebutted, and thus the default determination continues to be that the transaction committed.

If none of the checks of the record versions reveals torn writes ("Yes" in decision block 715), then the transaction has committed. In this case, each newly written record version (that was created by the transaction or rendered old by the transaction) is identified (act 720). The valid time interval is then updated for each identified record version using the post-commit processing information (act 721). For instance, for each rendered old record version that is rendered not current by the transaction, the valid interval end boundary (e.g., field 302) is updated using the commit marker (act 722). As an example, the valid interval end boundary may be replaced with CommitTS. For each newly created record version created by the transaction, the valid interval begin boundary (e.g., field 301) is updated using the commit marker (act 723). As an example, the valid interval begin boundary is replaced with CommitTS. The updated valid interval for each of the written record versions is then provided to the persistent system (act 724). The updated valid interval is thereafter confirmed to have been persisted to the persistent system (act 725), such as via a Persist command. The log buffer for this transaction may then be marked as "free".

This completes the first phase of recovery, which is performing the post-processing of each of the transactions to thereby update the valid time interval. In the final phase of recovery, the database is recovered to the last valid state. This is accomplished by performing three tasks: 1) identify all record versions that are current and thus should be part of the database state, 2) identify all record portions (also called herein "slots" or "record slots") that are empty or contain record versions that should not be part of the database state, and 3) rebuild the indexes of the database are rebuilt. FIG. 8 thus illustrates a flowchart of a method 800 for recovering the database, rebuilding indexes and freeing unused record slots. Method 800 may be performed for each of at least some portions corresponding to the database 221 in the persistent system 220A. In one embodiment, the portions constitution record slots. A record slot could be indicated to be empty, and without record version, if the valid interval begin boundary indicates, for example, zero. A record slot can also contain a corresponding record version otherwise. Each of the pages corresponding to the database 221 is identified, and is updated so that the list of free record slots is empty. The method 800 is then performed for each record slot of each page corresponding to the database.

The valid interval begin boundary (e.g., field 301) is accessed for the corresponding record slot (act 811). Flow then branches depending on whether the valid interval begin boundary indicates that the record slot is not part of a transaction ("Zero" in decision block 812), is part of an uncommitted record ("TID" in decision block 812), or otherwise ("TS" in decision block 812).

The valid interval begin boundary may be concluded to not be part of any transaction at all if, for instance, the valid interval begin boundary indicates a zero ("Zero" in decision block 812). In that case, the record slot is added to the free list of the corresponding page (act 813). In particular, if the clean slate embodiment is employed, the record slot is filled with the background pattern and provided to the persistent system. The record slot is then added to the free list of the corresponding page.

The valid interval begin boundary may be concluded to be part of an uncommitted transaction if, for instance, the valid interval begin boundary indicates a transaction ID ("TID" in decision block 812). Accordingly, the record version may be freed (act 820). For instance, the valid interval begin boundary (e.g., field 301) may be reset to zero. The record slot may then be filled with the background pattern and provided to the persistent system if the clean slate embodiment is employed, and thereafter (in either the checksum or clean slate embodiment) added to the free record slot list of the corresponding page (act 813). When providing a record slot to a persistent system, only the atomic units of the record slot that do not already contain the background pattern need be overwritten. Furthermore, it is only necessary in this clean slate embodiment to provide a cache line to the persistent system if it contains at least one atomic unit that has been overwritten. The majority of free record slots may arrive at act 813 via the "Zero" path out of decision block 812, and thus may likely already have the background pattern. Accordingly, reading before writing is likely to be a good optimization for them. On the other hand, free record slots that arrive at act 813 from act 820 are much less likely to contain the background pattern, so it may be more efficient to overwrite them with the background pattern unconditionally, and to write around the cache.

The valid interval begin boundary (e.g., field 301) may also be evaluated to conclude that valid interval end boundary (e.g., field 302) should be evaluated since the begin boundary includes a timestamp ("TS" in decision block 812). In this case, the record slot corresponds to a record version that was created through a committed transaction.

In this case, the valid interval end boundary is accessed for the record slot (act 815), and then processing flow branches depending on the nature of the valid interval end boundary (decision block 816). For instance, if the valid interval end boundary indicates infinity ("Infinity" in decision block 816), this means that the record slot corresponds to a record version that is current. Accordingly, the recovery identifies which table of the database the current record version belongs to (act 817), and adds the record version to the identified table (act 818), including inserting the version into all indexes associated with the table.

If the valid interval end boundary indicates a transaction ID ("TID" in decision block 816), this means that a transaction attempted to render the corresponding record version as old, but that the transaction did not commit. Accordingly, the valid interval end boundary is updated (act 819) to make the record version current again (by making the valid interval end boundary equal to infinity) and the update is provided to the persistent system. Furthermore, the recovery identifies which table of the database the current record version belongs to (act 817), and adds the record version to the identified table (act 818), including inserting the version into all indexes associated with the table.

If the valid interval end boundary indicates a timestamp ("TS" in decision block 816), this means that the version was rendered old by a committed transaction. Accordingly, the record version may be freed (act 820). For instance, the valid interval begin boundary may be reset to zero, indicating availability of the record slot for use in creating a future record version. Updates to the record slot may be provided to the persistent system and the record slot may then be added to the free list of record slots (act 813).

Accordingly, the principles described herein provide an effective mechanism for performing transactions in a database that is persisted in a persistent system, and recovery of a system failure in the context of the same.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A recovery method implemented by a computing system that includes a persistent system coupled to one or more processors via a bus, the method comprising:
    an act of accessing from a log buffer a transaction-level torn-write guard associated with post-commit processing information associated with a transaction, the transaction-level torn-write guard comprising at least one of a checksum of the log buffer or a bitmap associated with predetermined pattern written to the log buffer;
    an act of verifying that the post-commit processing information contains no torn writes using the transaction-level torn-write guard accessed from the log buffer;
    in response to the act of verifying, an act of performing the following for each of at least one record version of the record versions created by the transaction:
        an act of identifying the at least one record version created by the transaction using the post-commit processing information;
        an act of finding a record-version-level torn-write guard included within the log buffer associated with the at least one record version, the record-version torn-write guard comprising at least one of a checksum of the at least one record version or a bitmap associated with a predetermined pattern written to the at least one record version; and an act of using the corresponding record-version-level torn-write guard from the log buffer to confirm whether or not the corresponding record version has no torn writes.

2. The recovery method in accordance with claim 1, wherein for each of the at least some of the record versions created by the transaction, the act of using the corresponding record-version-level torn-write guard results in a confirmation that each of the at least some record versions have no torn writes.

3. The recovery method in accordance with claim 1, further comprising the following for each record version updated by the transaction:
an act of modifying the corresponding updated record version to show that it is invalid after a commit time of the transaction.

4. The recovery method in accordance with claim 3, wherein the corresponding updated record version is modified by setting a valid interval end boundary of the corresponding updated record version equal to a commit marker associated with the transaction.

5. The recovery method in accordance with claim 3, further comprising:
an act of providing at least modifications to the updated record versions to a persistent system.

6. The recovery method in accordance with claim 3, further comprising the following for each record version created by the transaction:
an act of modifying the corresponding created record version to show that it is valid after the commit time of the transaction.

7. The recovery method in accordance with claim 6, wherein the corresponding created record version is modified by setting a valid interval begin boundary of the corresponding created record version equal to a commit marker associated with the transaction.

8. The recovery method in accordance with claim 6, further comprising:
an act of providing at least modifications to the created record versions to the persistent system.

9. The recovery method in accordance with claim 8, further comprising:
an act of confirming that the modifications to the updated and created record versions have been persisted in the persistent system.

10. The method in accordance with claim 1, wherein the computing system responds to a confirmation that a log buffer has torn writes by at least undoing a transaction associated with the log buffer.

11. The method in accordance with claim 1, wherein the computing system responds to a confirmation that a log buffer does not have torn writes by at least performing the following for each of at least some of the record versions created by the corresponding transaction:
an act of identifying the corresponding record version created by the transaction using contents of the log buffer;
an act of finding a record-version-level torn-write guard associated with the corresponding record version in the log buffer; and
an act of using the corresponding record-version-level torn-write guard to determine whether or not the corresponding record version has any torn writes.

12. The method in accordance with claim 11, wherein the computing system responds to a confirmation that a record version of a log buffer associated with a transaction has torn writes by at least undoing a transaction associated with the log buffer.

13. The method in accordance with claim 11, wherein the computing system responds to a confirmation that there are no record versions of a log buffer associated with a transaction that has torn writes by performing the following for each record version updated by the transaction:
an act of modifying the corresponding updated record version to show that it is invalid after a commit time of the transaction; and
an act of providing at least modifications to the updated record versions to a persistent system.

14. The method in accordance with claim 13, wherein the computing system responds to a confirmation that there are no record versions of a log buffer associated with a transaction that has torn writes by performing the following for each record version created by the transaction:
an act of modifying the corresponding created record version to show that it is valid after a commit time of the transaction; and
an act of providing at least modifications to the created record versions to a persistent system.

15. The method in accordance with claim 13, wherein the computing system responds to a confirmation that there are no record versions of a log buffer associated with a transaction that has torn writes by performing the following:
an act of confirming that the modifications to the updated and created record versions have been persisted in the persistent system.

16. The method in accordance with claim 15, wherein the computing system responds to a confirmation that the modifications to the updated and created record versions have been persisted in the persistent system by performing the following:
an act of cleaning up garbage and rebuilding the indexes of a database.

17. The method in accordance with claim 16, further comprising the following for each of at least some memory portions corresponding to a database in the persistent system:
an act of accessing a valid interval begin boundary for the memory portion;
an act of using the valid interval begin boundary to identify that the memory portion contains at least a portion of a record version that is not part of a transaction; and
an act of adding the memory portion to a free list of the persistent memory.

18. The method in accordance with claim 16, wherein the act of rebuilding indexes comprises the following for each of at least some portions corresponding to a database in the persistent system:
an act of accessing a valid interval begin boundary for the memory portion;
an act of using the valid interval begin boundary to identify that the memory portion contains at least a portion of a record version that part of an uncommitted transaction;
an act of modifying the memory portion so that the record version is no longer part of the uncommitted transaction; and
an act of adding the memory portion to a free list of the persistent memory.

19. The method in accordance with claim 16, wherein the act of rebuilding indexes comprises the following for each of at least some portions corresponding to a database in the persistent system:
- an act of accessing a valid interval begin boundary for the memory portion;
- an act of using the valid interval begin boundary to identify that the memory portion contains at least a portion of a record version that is part of a committed transaction; and
- an act of accessing a valid interval end boundary for the memory portion.

20. The method in accordance with claim 19, the method further comprising:
- an act of using the valid interface end boundary for the memory portion to identify that the memory portion includes at least a portion of a particular record version that is current; and
- an act of identifying which table of the database the current record version belongs to; and
- an act of adding the current record version to the identified table of one or more indexes of the identified table.

21. The method in accordance with claim 19, the method further comprising:
- an act of using the valid interface end boundary for the memory portion to identify that the memory portion includes at least a portion of a particular record version; and
- an act of identifying that the particular record version belongs to an uncommitted transaction that attempted to delete the particular record version;
- an act of modifying the memory portion so that the particular record version is no longer part of the uncommitted transaction;
- an act of identifying which table of the database the particular record version belongs to; and
- an act of adding the particular record version to the identified table of one or more indexes of the identified table.

22. The method in accordance with claim 19, the method further comprising:
- an act of using the valid interface end boundary for the memory portion to identify that the memory portion includes at least a portion of a record version deleted by a committed transaction; and
- an act of adding the memory portion to a free list of the persistent memory.

23. A system comprising:
- one or more processors:
- a persistent system;
- a bus coupling the one or more processors to the persistent system; and
- a recovery system configured to communicate with the persistent system over the bus to perform a recovery by performing the following acts:
    - an act of accessing from a log buffer a transaction-level torn-write guard associated with post-commit processing information associated with a transaction, the transaction-level torn-write guard comprising at least one of a checksum of the log buffer or a bitmap associated with predetermined pattern written to the log buffer;
    - an act of verifying that the post-commit processing information contains no torn writes using the transaction-level torn-write guard accessed from the log buffer;
    - in response to the act of verifying that the post-commit processing information contains no torn writes, an act of performing the following for each of at least one record version of the record versions created by the transaction:
        - an act of identifying the at least one record version created by the transaction using the post-commit processing information;
        - an act of finding a record-version-level torn-write guard included within the log buffer associated with the at least one record version, the record-version torn-write guard comprising at least one of a checksum of the at least one record version or a bitmap associated with a predetermined pattern written to the at least one record version; and
        - an act of using the corresponding record-version-level torn-write guard from the log buffer to confirm whether or not the corresponding record version has no torn writes.

24. The system of claim 23, wherein the recovery system is configured to verify that the post-commit processing information contains no torn writes by at least comparing the checksum to a newly computed checksum of the log buffer or by at least checking for one or more atomic units in the log buffer that contain the predetermined pattern.

* * * * *